March 29, 1927.
C. B. NORRIS
1,623,020
MACHINE FOR CUTTING GROOVES IN FLAT PANELS
Filed May 2, 1924
3 Sheets-Sheet 1
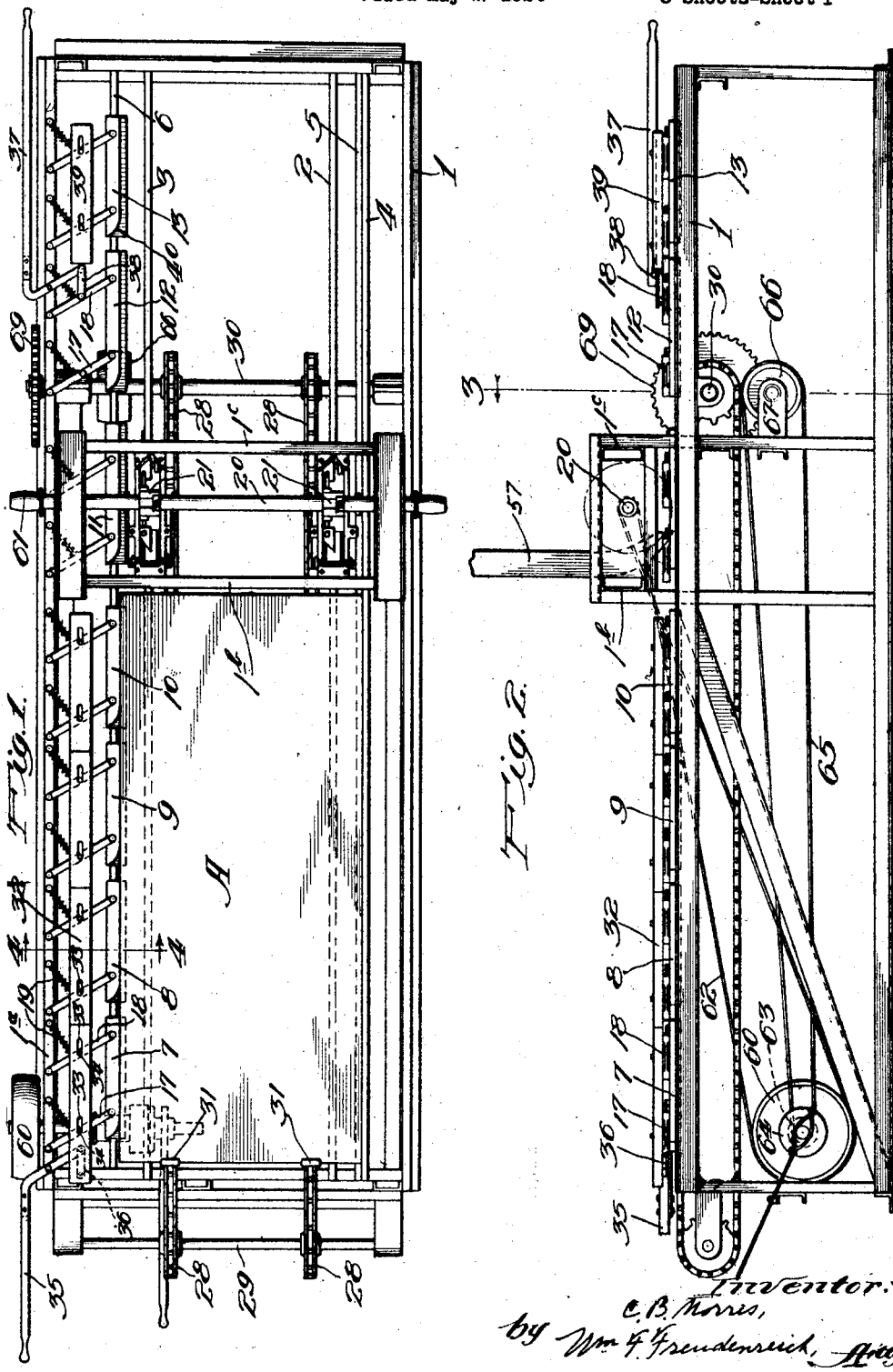

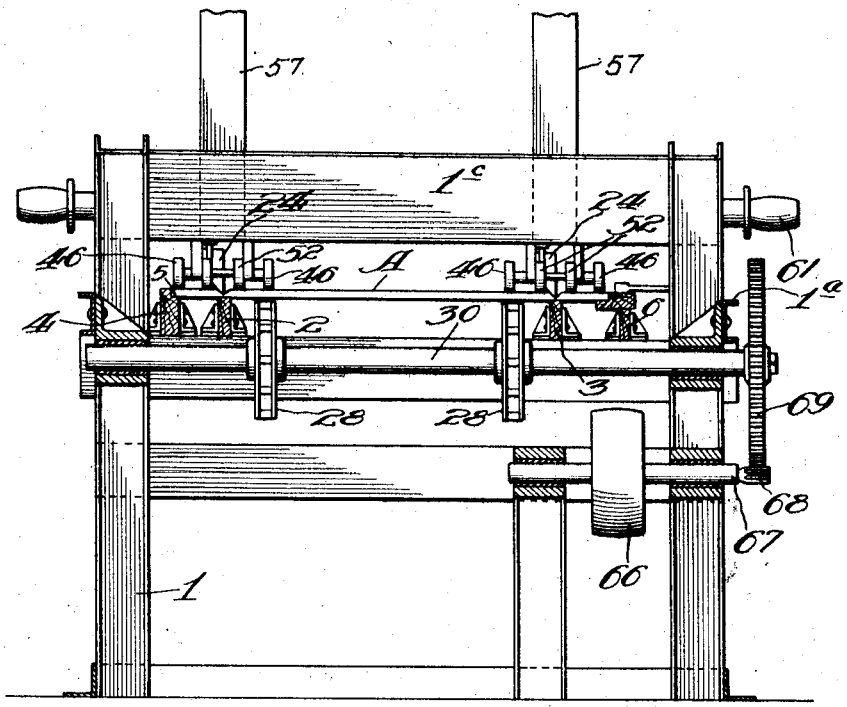

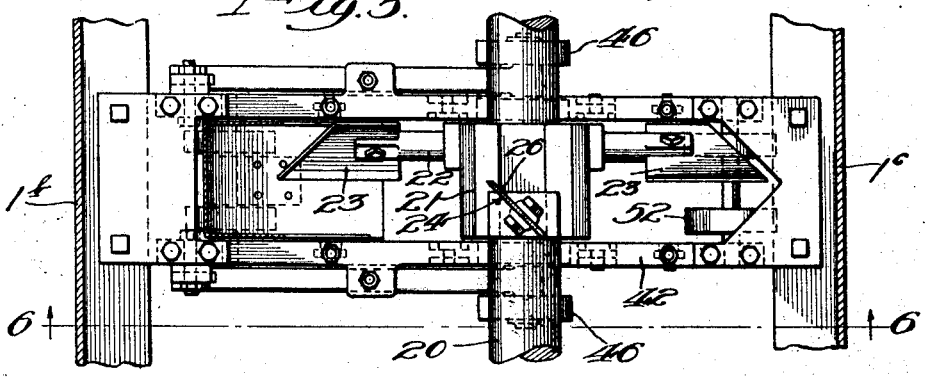
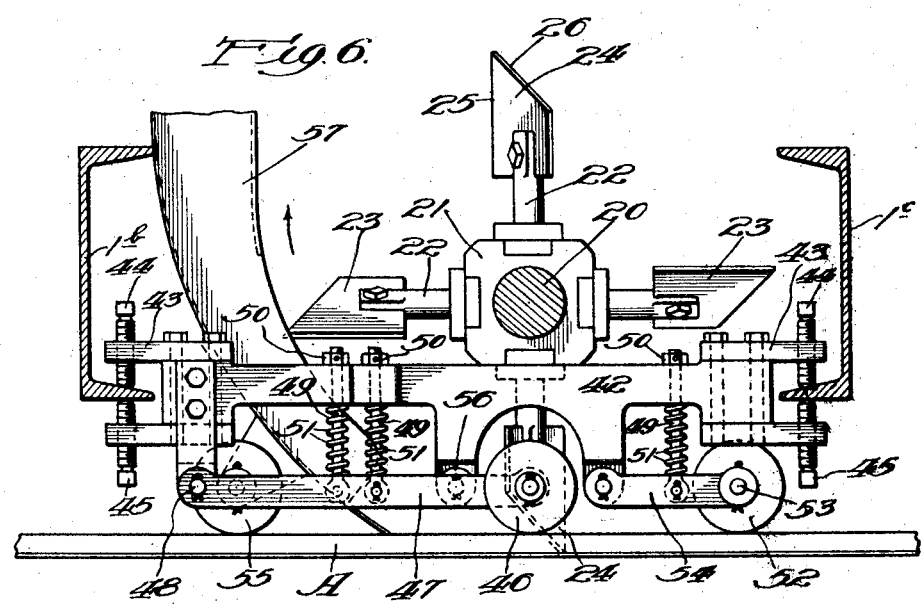

Patented Mar. 29, 1927.

1,623,020

UNITED STATES PATENT OFFICE.

CHARLES B. NORRIS, OF GRAND RAPIDS, MICHIGAN, ASSIGNOR TO HASKELITE MANUFACTURING CORPORATION, A CORPORATION OF NEW YORK.

MACHINE FOR CUTTING GROOVES IN FLAT PANELS.

Application filed May 2, 1924. Serial No. 710,688.

In the manufacture of products out of so-called Plymetl, which consists of a wooden panel sheathed with comparatively thin metal glued to a broad face thereof, a plurality of walls arranged at angles to each other may conveniently be formed by grooving the panels down to the metal sheathing, and then bending the panels along the lines of these grooves. The grooves may of course take any desired forms but are preferably V-shaped, the angle of each V being preferably such that when the sections of a panel adjacent to a groove are brought into the relative positions which they are to occupy in the finished product, the sides of the groove will come in contact with each other and thus form a solid corner. These grooves therefore must be accurately fashioned and where there are more than two walls of a cabinet, post, or other structure to be formed out of a single panel, it is necessary that the grooves be accurately located relatively to each other.

The object of the present invention is to produce a simple and novel machine for quickly and accurately grooving panels.

The various features of novelty whereby my invention is characterized will hereinafter be pointed out with particularity in the claims; but for a full understanding of my invention and of its objects and advantages reference may be had to the following detailed description taken in connection with the accompanying drawings, wherein:

Figure 1 is a top plan view of a machine arranged in accordance with my invention, the hood device for carrying away the material removed from the panel by the cutters, being shown in section; Fig. 2 is a side elevation of the machine, the cutters and the rollers for pressing the work on the table being omitted; Fig. 3 is a section on an enlarged scale taken approximately on line 3—3 of Fig. 2; Fig. 4 is a section on an enlarged scale taken approximately on line 4—4 of Fig. 1; Fig. 5 is a view similar to but on a larger scale than Fig. 1, showing only a fragment of the machine in the vicinity of one of the sections; and Fig. 6 is a section taken approximately on line 6—6 of Fig. 5.

The machine consists of a suitable framework 1, having a long, broad, flat bed or table. Since the operations are performed along separated lines extending across a panel, the table need not have a continuous surface and is preferably made of a plurality of long parallel tracks or rails of which two 2 and 3, are shown. At one side of one of the rails, namely on the side remote from the other rail, is a long guide beam 4 projecting above the top surfaces of the work-supporting rails and preferably having at the inner upper corner a seat 5, lying in said plane. Therefore, when a panel is placed on the supporting rails one side edge engages with the guide and the adjacent marginal portion rests on and is supported by the seat forming part of the guide, as best shown in Fig. 3, in which A indicates the panel. If the panel is moved along the rails, with its edge held firmly against the guide, it will be seen that every point therein travels accurately in a straight line. Means are provided for yieldingly engaging the opposite edge of the panel in order to maintain thereon a pressure which will hold it at all times against the guide. There is a rail 6, arranged on the opposite side of the machine from that on which the guide is located, this rail being lower than the supporting rails. Distributed along the rail 6, and resting upon the top of the same are a series of shoes numbered 7 to 13 inclusive, these shoes being arranged end to end and being placed apart a short distance from each other.

Each shoe, as best shown in Fig. 4, has a vertical face 14, adapted to engage the adjacent edge of the panel, and an inwardly-projecting horizontal seat or ledge 15, on which the panel rests. In the arrangement shown, each shoe is pivotally connected to the ends of two parallel rods 17 and 18, the other ends of which rods are hinged or pivotally connected to the side member 1ª of the frame of the machine, and the pivotal connections are such that the shoes may swing bodily in a horizontal plane moving from or toward the longitudinal center of the machine according to the directions in which they are swung. A spring 19 is placed between each of the rods 17 and 18 and the stationary frame of the machine, these springs tending constantly to swing the shoes so as to carry them toward the longitudinal center of the machine. The rods 18 and 19 are all of the same length, so that the guiding edges of the shoes always stand parallel with the longitudinal center of the machine, that is parallel to the guide 4. Therefore when a panel is placed in the machine, with one edge engaging the guide 4 and the shoes yieldingly engaging the other edge, it is yieldingly but firmly held against the guide.

The grooves are adapted to be cut into the panel by means of rotary cutters overlying the table, the work being carried past the cutters by any suitable means. In the arrangement shown, there is a shaft extending horizontally across the machine at some distance above the supporting rails. On this shaft are as many heads as there are grooves to be cut, two of such heads 21, 21 being shown. As best shown in Figs. 5 and 6, each head is provided with a series of radial projecting arms 22 on the outer ends of which are placed blades, preferably flat blades that lie in planes making an angle to the axis of the shaft 20. In the arrangement shown, there are four of these blades arranged in pairs, 23, 23 and 24, 24. The construction illustrated is such that V-shaped grooves will be cut in the panel, one of such grooves being indicated at *a* in Fig. 4. The blades of each pair are adapted to cut one half of each groove, namely that portion lying one one side of a vertical plane containing the line of the bottom of the groove. Therefore each blade has a vertical cutting edge 25, and an inclined cutting edge 26. The planes of the blades in one pair are approximately at right angles to the planes of the blades of the other pair; the blades of one pair are so disposed that while their edges lie in substantially the same plane as the corresponding edges of the other pair, the two sets of blades lie on opposite sides of the latter plane.

The work may be carried along the supporting rails underneath the cutters in any suitable way. In the arrangement shown, there are two endless chains 28, 28, extending over suitable sprocket wheels on horizontal shafts 29 and 30, one of which is arranged at one end of the machine while the other is arranged beyond the cutter shaft. Each chain is provided with a block or projection 31, best shown in Fig. 1, adapted to engage with the rear or trailing edge of a panel lying on the rails, so as to push the panel along the rails through the machine.

In order to make it easy to place a panel in the machine and take it out, it is advisable that means be provided for swinging the shoes out of engagement with the panel. In the arrangement shown, there is a bar 32, extending opposite and parallel with the shoes 7 to 10 inclusive, the bar being provided with a series of slots 33, each overlying one of the swinging rods or links 17, 18. Each of these rods or links is provided with a pin 34, extending through the corresponding slot. There is an actuating lever 35 pivoted to the frame of the machine and connected at one end to the bar 32, by a link 36. When the actuating lever is swung in the counterclockwise direction, as viewed in Fig. 1, it acts through the link 36 to push the bar 32 toward the right, thus swinging the shoes outwardly and away from the panel. The bar 32 is not made continuous but is divided into sections, each corresponding to one of the shoes, the sections abutting end to end. In this way each shoe is left free to act independently of the others while holding the panel in place. The shoe 11 is directly underneath the cutter shaft and the work will be carried beyond the same by the traveling chains at the end of the cutting operation, and therefore no manual actuating means are required for this shoe. The shoe 12 is controlled by a lever 37, connected to the supporting rod 18 thereof by means of a link 38. This link, or the end of the lever to which the link is attached, abuts against the end of a bar 39, similar to one of the sections of the bar 32 and attached to the supporting rods of the shoe 13 in the same manner as the sections of the bar 32 are attached to the supporting rods for the corresponding shoes. Therefore, if the lever 37 is swung in the counterclockwise direction, as viewed in Fig. 1, the shoe 12 is swung outwardly through the direct action of the lever and the shoe 13 is similarly moved by reason of the engagement of the lever with the bar 39. When a panel is to be placed in the machine, the lever 35 is actuated to move the corresponding shoes into an inoperative position. When a panel has reached the end of its movement in the machine and is to be removed, the lever 37 is actuated, so as to withdraw the shoes 12 and 13. It will be noted that the advance inner corner 40 of each shoe is rounded so that the shoes may normally be allowed to project somewhat into the path of the oncoming panel; the advancing corner of the panel engaging with the rounded corner of the shoes and forcing the shoes outwardly. In this way, a yielding pressure of each shoe against the side edge of the panel is assured.

The work is held firmly on the supporting rails in the zone in which the cutting is taking place, to avoid chattering and consequent unevenness in the grooves. The parts are so adjusted that the lines of cutting overlie and extend in the direction of the length of the supporting rails. Any suitable yielding pressure device, preferably acting on the work on both sides of the plane of each cutter member, may be employed. In the arrangement shown, there are six pressure rollers associated with each cutter member, three on each side of the member. These rollers are conveniently carried by a frame 42 which, as best shown in Figs. 5 and 6, extends between two transverse beams, 1ᵇ and 1ᶜ arranged on opposite sides of the cutter shaft and forming part of what may be termed the supporting pedestal structure for that shaft. These beams are shown as taking the form of channels having their flanges directed toward each other, and the frame 42 is provided with jaws 43, 43 at its ends for embracing the lower flanges of these beams. Each jaw is provided with set screws 44 and 45, one of which engages the top of the corresponding flange and the other the under face or side of the flange. This arrangement permits the frame to be adjusted along these supporting beams whenever the corresponding cutter member is shifted along its supporting shaft, and also permits the vertical adjustment of the frame to be varied. The frame is open in the center to leave a space for the reception of the corresponding cutter member. There are two pressure rollers 46, 46, lying directly under the shaft 20, each roller being journaled on one end of an arm 47 that is pivotally connected at its opposite end, as indicated at 48, to the frame 42. The rod 49 is hinged at its lower end to the arm 47 and passes upwardly through a stationary part 42; being provided on its upper end, above this frame, with a nut 50. This nut limits the downward swinging movement of the arm. Surrounding the rod 49 and bearing at its ends respectively against the upper edge of the arm 47 and against the underside of a part of the frame 42 is a spring 51, that yieldingly presses the arm 47, and therefore the roller 46, downwardly. There are two other pressure rollers 52, 52 lying under one end of the frame 42, these rollers being closer together than are the rollers 46. The rollers 52 are mounted on a common shaft 53 supported in the free ends of a pair of swinging arms 54, provided with rods 49, nuts 50, and springs 51, such as heretofore described. There is another pair of rollers 55, 55 arranged under the other end of the frame, these rollers being mounted in the same way as the rollers 52, namely on the ends of swinging arms pivotally supported as indicated at 56, pressed downwardly by means of springs 51, surrounding rods 49 hinged to these arms and passing upwardly through a part of the frame, where they are provided with nuts 50.

It will thus be seen that the panel is pressed down on the supporting rail at two points lying close to the lines of cutting, both in advance of each cutter member and beyond the cutter member; and there is a similar yielding downward pressure at two points in a transverse line passing through the cutting point beneath each member.

If desired, means may be provided for carrying away the material that is cut out of the panel. In the arrangement shown, there is a spout 57, arranged in advance of each of the cutter members, in such position that as the fragments of wood are cut from the panel they are thrown toward the mouths of these spouts. The spouts being connected to a suitable suction apparatus, the waste material will be drawn into and through the spouts.

The cutters and the chains may be driven in any suitable way, the particular connections being of no importance, as long as the cutters are caused to rotate at a high speed and the chains to travel slowly so as to carry the work through the machine at the proper speed. In the arrangement shown, there is a main belt pulley 60, adapted to be connected to a small pulley 61 on the cutter shaft by a suitable belt, shown at 62 in Fig. 2. A small pulley 63, may be clutched to the main pulley 60 by means of a suitable clutch 64, so as to be driven directly thereby. A belt 65 passes over the pulley 63 and another pulley 66 lying directly under the shaft 30. On the shaft 67 of the pulley 66 is a pinion 68 that meshes with a large gear wheel 69 on the shaft 30. It will be seen that whenever the pulley 60 is running the cutter members will rotate at a high speed; but the chains for moving the work through the machine will remain stationary except when the clutch 64 is thrown in and then will travel only slowly.

It will thus be seen that when a panel is moved through the machine, it will be held against a guide at one edge with sufficient pressure to insure that it will travel in a straight line and it will also be yieldingly held on the supports underneath the same at a sufficient number of points in the cutting zones to insure a uniform depth of cut. By providing the cutter heads with oppositely disposed cutting blades a balanced effect is obtained and there is no tendency to push the panel laterally while a cut is being made. By holding and controlling the panel in the manner explained, no clamps or other fastening devices are required, but the panels are automatically held and adjusted. Consequently, the work of placing the panels in and removing them from the machine is simple and easy. It will also be seen that all the parts are such that adjustments may readily be made to vary the number of grooves to be cut, the spacing thereof and their cross-sectional shapes.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a machine of the character described, a table comprising stationary parallel rails, an elevated rotatable shaft extending transversely across the rails parallel with the tops thereof, cutter heads on said shaft directly above the rails, means for moving a panel resting on the rails along the same past the cutters, and means near the cutter engaging the panel on each side of and in advance and in rear of each cutter yieldingly to press the panel against the rails.

2. In a machine of the character described, a table comprising stationary parallel rails, an elevated rotatable shaft extending transversely across the rails parallel with the tops thereof, cutter heads on said shaft directly above the rails, means for moving a panel resting on the rails along the same past the cutters, rollers supported at the sides of and in front and behind each cutter so as to be movable within limits in the vertical direction, and springs acting on said rollers and tending constantly to force them nearer to the plane of the tops of the rails than the thickness of the panel.

3. In a machine of the character described, a table, a guide extending along one side of the table and projecting above the top thereof, a series of shoes arranged at the opposite side of the table, supports for said shoes permitting them to move from and toward said guides and always remain parallel therewith, springs acting on said shoes and tending to press them toward said guide, a bar associated with said shoes to move the same against the resistance of said springs, a lever for actuating said bar, said bar being divided into sections corresponding in number to the shoes and abutting end to end, and means for moving along the table a panel resting on the same and engaged at opposed edges with said guides and said shoes.

4. In a machine of the character described, a table comprising a plurality of parallel main rails, a guide rail at one side of the main rails having a supporting surface lying in the same plane as the tops of the main rails and a guide ledge projecting above the same and extending lengthwise thereof, an auxiliary rail on the other side of the main rails having its top below the tops of the main rails, shoes resting on the auxiliary rail and having supporting surfaces lying in the same plane as the tops of the main rails and ledges projecting above such plane and adapted to engage with an edge of a panel resting on the main rails and on the supporting surfaces of the guide rails and of the shoes, and springs acting on the shoes to press the panel against the guide ledge on the guide rail.

5. In a machine of the character described, a table comprising a plurality of parallel main rails, a guide rail at one side of the main rails having a supporting surface lying in the same plane as the tops of the main rails and a guide ledge projecting above the same and extending lengthwise thereof, an auxiliary rail on the other side of the main rails having its top below the tops of the main rails, shoes resting on the auxiliary rail and having supporting surfaces lying in the same plane as the tops of the main rails and ledges projecting above such plane and adapted to engage with an edge of a panel resting on the main rails and on the supporting surfaces of the guide rails and of the shoes, springs acting on the shoes to press the panel against the guide ledge on the guide rail, and means for moving the panel in the direction of the length of the rails.

6. In a machine of the character described, a table comprising a plurality of parallel main rails, a guide rail at one side of the main rails having a supporting surface lying in the same plane as the tops of the main rails and a guide ledge projecting above the same and extending lengthwise thereof, an auxiliary rail on the other side of the main rails having its top below the tops of the main rails, shoes resting on the auxiliary rail and having supporting surfaces lying in the same plane as the tops of the main rails and ledges projecting above such plane and adapted to engage with an edge of a panel resting on the main rails and on the supporting surfaces of the guide rails and of the shoes, springs acting on the shoes to press the panel against the guide ledge on the guide rail, means for moving the panel in the direction of the length of the rails, and rotary cutters arranged above the main rails.

7. In a machine of the character described, a table comprising a plurality of parallel main rails, a guide rail at one side of the main rails having a supporting surface lying in the same plane as the tops of the main rails and a guide ledge projecting above the same and extending lengthwise thereof, an auxiliary rail on the other side of the main rails having its top below the tops of the main rails, shoes resting on the auxiliary rail and having supporting surfaces lying in the same plane as the tops of the main rails and ledges projecting above such plane and adapted to engage with an edge of a panel resting on the main rails and on the supporting surfaces of the guide rails and of the shoes, springs acting on the shoes to press the panel against the guide ledge on the guide rail, means for moving the panel in the direction of the length of the rails, rotary cutters arranged above the main rails, and means for yieldingly pressing the panel against the main rails in the vicinity of the cutters.

In testimony whereof, I sign this specification.

CHARLES B. NORRIS.